Figure 1:
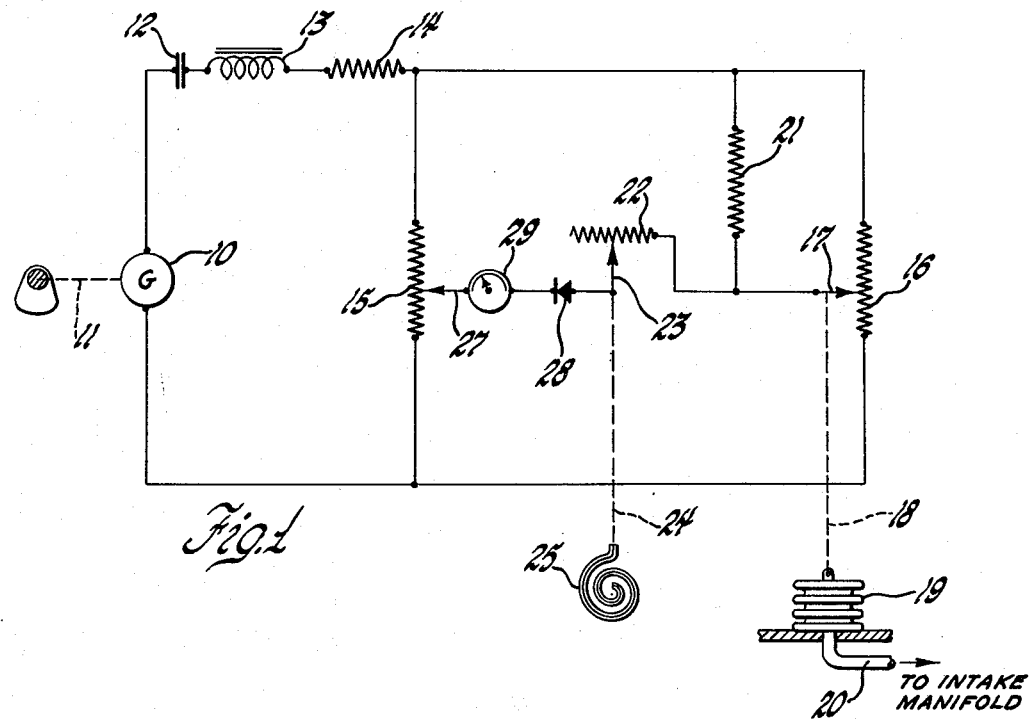

June 2, 1964  F. L. BEDARD ETAL  3,135,110

ENGINE HORSEPOWER METER

Filed Oct. 13, 1960

INVENTORS
Francis L. Bedard &
BY Carle E. Mathis

Paul J. Ethington
ATTORNEY 3,135,110
ENGINE HORSEPOWER METER
Francis L. Bedard, Troy, and Carle E. Mathis, Warren, Mich., assignors to General Motors Corporation, Detroit, Mich., a corporation of Delaware
Filed Oct. 13, 1960, Ser. No. 62,425
4 Claims. (Cl. 73—115)

This invention relates to a measuring device adapted to provide an indication of engine horsepower.

The horsepower output of an internal combustion engine is directly related to the product of engine speed and engine torque. Engine torque, in turn, is closely related to the engine intake manifold pressure. These two factors, engine speed and manifold pressure, are easily detected, and so a general indication of engine horsepower may be readily obtained. However, for more precise measurements, the fact must be taken into account that engine torque is not linearly related to manifold pressure for engine speeds above or below the engine torque peak. Also, manifold pressure, and likewise horsepower output, are affected by pressure conditions, and so this factor must be compensated in a practical measuring system. Without compensation, a further error would be induced due to variations in the horsepower output that are caused by changes in the ambient temperature conditions.

It is the principal object of this invention to provide an improved instrument for indicating engine horsepower. A further object is to provide apparatus which produces an indication of engine horsepower based upon engine speed and intake manifold pressure. Another object is to provide an engine horsepower meter wherein the effects of variations in ambient temperature and pressure and nonlinear torque-pressure characteristics are compensated. An additional object is to provide an engine horsepower meter which accounts for nonlinear torque-speed characteristics.

In accordance with this invention, an A.C. tachometer generator is coupled to the engine crankshaft to provide an A.C. signal having amplitude and frequency related to engine speed. Coupled to the generator output is an inductance-capacitance circuit which is tuned to a frequency corresponding to the engine speed at the engine torque peak. Also coupled to the tachometer output there is a potentiometer which includes a movable tap that is mechanically coupled to an absolute pressure responsive device on the engine intake manifold. The voltage appearing between the tap and a reference point will be related to the product of engine r.p.m. and manifold pressure, and so a meter responsive to this voltage provides an indication of horsepower. A variable resistor in the meter circuit may compensate for the effects of ambient temperature.

Figure 2:
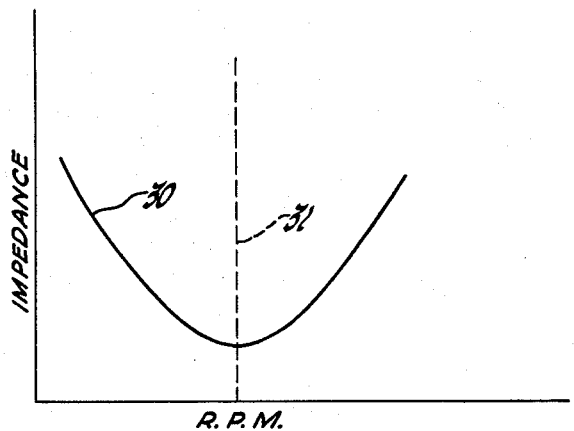

In the drawings:

FIGURE 1 is a schematic diagram of an electrical circuit employed in an engine horsepower meter incorporating the principal features of the invention; and FIGURE 2 is a graphic representation of the characteristics of a portion of the circuit of FIGURE 1.

With reference to FIGURE 1, there is shown an A.C. tachometer generator 10 which has an armature coupled by a suitable mechanical linkage 11 to the crankshaft of an internal combustion engine. Connected in series relation across the output of the generator 10 are a capacitor 12, an inductor 13, a current limiting resistor 14, and a potentiometer 15. The values of the capacitor 12 and the inductor 13 are selected to provide a series resonant circuit having a resonant frequency equal to the frequency of the tachometer output at the engine torque peak. Also in series with the inductance-capacitance circuit and across the potentiometer 15 there is connected a potentiometer 16 having the movable tap 17. The tap 17 is connected by a suitable mechancial coupling 18 to an absolute pressure responsive device 19. The device 19 is coupled by a conduit 20 to the intake manifold of the internal combustion engine. Thus the position of the tap 17 on the potentiometer 16 will be determined by the absolute pressure in the intake manifold and will not be influenced by changes in ambient pressure, except as reflected by variations in intake manifold pressure. Connected between the tap 17 and one side of the potentiometer 16 is a compensating resistor 21 to correct for nonlinear torque with variable manifold vacuum. Also connected to the tap 17 is a variable resistor 22 which has a movable tap 23 that is coupled by a mechanical linkage 24 to a thermostat or temperature responsive device 25. This device 25, which may be a simple bi-metal arrangement, is responsive to engine intake air temperature and is effective to vary the position of the tap 23 in accordance therewith. Between the tap 23 and a tap 27 on the potentiomeer 15 are connected a diode 28 and a direct current responsive device 29 which may be a meter, recorder, or other suitable indicating means.

In the operation of the apparatus of FIGURE 1, the tachometer 10 is driven by the engine crankshaft, producing an output signal having a frequency directly related to engine speed. This signal is impressed across the series-parallel combination of the resonant circuit and the potentiometers 15 and 16. The impedance presented by the capacitor 12 and inductor 13 in series will vary as shown in FIGURE 2 wherein a line 30 represents series impedance as a function of engine r.p.m. This impedance is a minmum at a resonant frequency 31 which is selected to be equal to the speed of the engine at the engine torque peak. The capacitor 12 has a high impedance at low speeds, compensating for the drop in engine torque at speeds below the engine torque peak. The inductor 13 presents increasing impedance with speed, compensating for the torque drop at engine speeds above the torque peak. Thus it is seen that the fraction of the tachometer output voltage which will appear across the potentiometers 15 and 16 will vary with engine r.p.m. The magnitude of the A.C. voltage at the output of the generator 10, and likewise the voltage appearing across the potentiometers 15 and 16, will also vary with engine speed.

For zero torque, or when the engine is idling, the tap 27 of the potentiometer 15 is adjusted so that the voltage between the taps 17 and 27 is zero. As engine load increases, with a resultant increase in the horsepower output the absolute pressure at the intake manifold will decrease, changing the position of the tap 17. This will result in a voltage drop between taps 17 and 27, causing current flow through the meter 29, which can be calibrated to read in units of horsepower. Likewise, for constant load, an increase in speed will cause an increase in horsepower output, and the meter 29 will reflect this increase since the voltage output of the tachometer will increase, even though the tap 17 remains stationary.

A variation in atmospheric pressure changes the intake manifold pressure and this affects the engine torque. This effect is automatically compensated since the device 19 is responsive to absolute pressure. Another condition which has an effect on engine torque is ambient temperature. This effect is compensated by the variations in the action of the temperature responsive device 25 which changes the position of the tap 23. For example, a decrease in temperature would decrease engine torque and so the device 25 would move the tap 23 to the left, decreasing the current through the meter 29.

While this invention has been described in terms of an illustrative embodiment, it is of course understood that

We claim:

1. An engine horsepower indicator comprising generating means for generating a signal related in magnitude and frequency to engine speed, a resonant circuit and a voltage dividing impedance connected in series with said generating means, the resonant circuit being tuned to a frequency related to the engine speed at the engine torque peak, said impedance means having a movable tap adapted to be varied in accordance with engine intake manifold pressure, and indicating means connected to said movable tap and a reference point to provide an indication of engine horsepower.

2. Apparatus for obtaining an indication of engine horsepower comprising means for generating a signal related in magnitude and frequency to engine speed, a series resonant circuit having a resonant frequency corresponding to the frequency of said signal at the engine torque peak, a potentiometer connected in series with the resonant circuit and said generating means, absolute pressure responsive means connected to the engine intake manifold and adapted to vary the position of a tap on said potentiometer in accordance with manifold pressure, and voltage responsive indicating means connected between said tap and a reference point.

3. Apparatus for obtaining an indication of engine horsepower comprising a tachometer generator driven at engine speed, a series resonant circuit having a resonant frequency corresponding to the generator output frequency at the engine torque peak, a potentiometer connected in series with the resonant circuit and said generator, absolute pressure responsive means connected to the engine intake manifold and adapted to vary the position of a tap on said potentiometer in accordance with manifold pressure, voltage responsive indicating means connected between said tap and a reference point, and variable resistance means in circuit with said indicating means and responsive to the engine intake air temperature.

4. Apparatus for obtaining an indication of engine horsepower comprising an A.C. tachometer generator driven at engine speed to develop a first voltage related in magnitude and frequency to engine speed, a resonant circuit, first and second potentiometers connected in parallel circuit, the resonant circuit and the parallel circuit being connected in series with the output of said generator, the resonant frequency of said circuit corresponding to the generator output frequency at the engine torque peak, whereby a second voltage across the potentiometers varies with engine speed due to the magnitude variation with engine speed and due to the frequency response of the resonant circuit, absolute pressure responsive means connected to the engine intake manifold and adapted to vary the position of a tap on the first potentiometer in accordance with manifold pressure, voltage responsive indicating means connected between the taps of said potentiometer being positioned so that the voltage thereon is equal to the voltage on the tap of the first potentiometer when the engine is idling, and a resistor in circuit with said indicating means and adapted to be varied in response to engine intake air temperature.

References Cited in the file of this patent

UNITED STATES PATENTS

| | | |
|---|---|---|
| 1,355,661 | Frisch | Oct. 12, 1920 |
| 1,390,510 | Douglas et al. | Sept. 13, 1921 |
| 2,070,842 | Reichel et al. | Feb. 16, 1937 |
| 2,331,128 | MacNeil | Oct. 5, 1943 |

UNITED STATES PATENT OFFICE
CERTIFICATE OF CORRECTION

Patent No. 3,135,110 June 2, 1964

Francis L. Bedard et al.

It is hereby certified that error appears in the above numbered patent requiring correction and that the said Letters Patent should read as corrected below.

Column 4, line 23, after "said" insert -- potentiometers, the tap on the second --.

Signed and sealed this 27th day of October 1964.

(SEAL)
Attest:

ERNEST W. SWIDER
Attesting Officer

EDWARD J. BRENNER
Commissioner of Patents